C. ELSASSER.
CARPET-CLEANER.

No. 172,919. Patented Feb. 1, 1876.

Witnesses
Geo. H. Strong.
Jno. L. Boone

Inventor
Charles Elsasser
by Dewey & Co,
Attys.

UNITED STATES PATENT OFFICE.

CHARLES ELSASSER, OF SAN FRANCISCO, CALIFORNIA.

IMPROVEMENT IN CARPET-CLEANERS.

Specification forming part of Letters Patent No. 172,919, dated February 1, 1876; application filed December 18, 1875.

*To all whom it may concern:*

Be it known that I, CHARLES ELSASSER, of San Francisco city and county, State of California, have invented a Portable Carpet Beater and Cleaner; and I do hereby declare the following description and accompanying drawings are sufficient to enable any person skilled in the art or science to which it most nearly appertains, to make and use my said invention without further invention or experiment.

My invention relates to a machine which is adapted for beating and cleaning carpets upon the floor without taking them up.

It consists of a box which is divided horizontally into two compartments, the bottom of the lower compartment being open, and a spring-beater being placed in it so as to be operated by a friction-wheel which is rotated by pressure against the floor, as the box is moved along.

A suction-fan is arranged to draw the dust which is raised by the beater into the upper compartment or dust-chamber.

In order to further describe my invention, reference is had to the accompanying drawings, in which—

Figure 1:
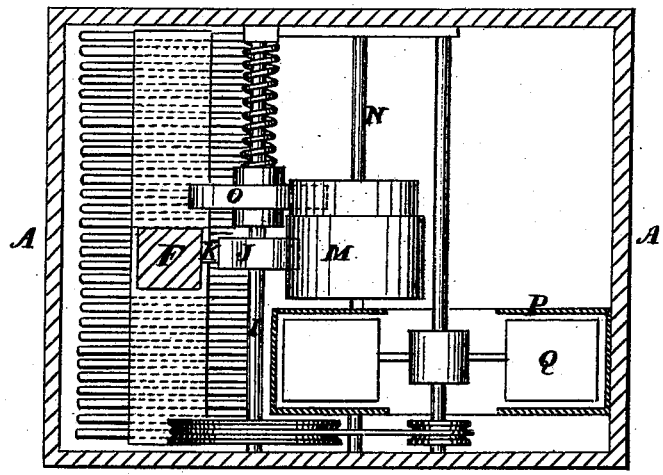
Figure 2:
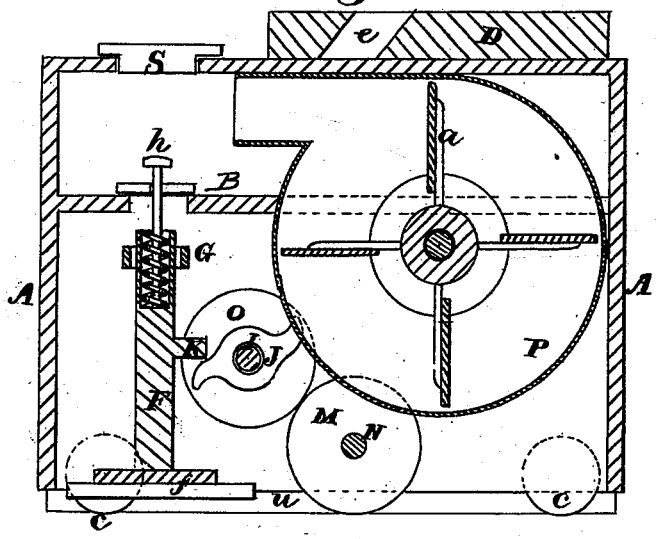

Figure 1 is a horizontal section. Fig. 2 is a vertical section.

A represents a box of any desired size, the bottom of which is open while the top is closed. This box is divided horizontally by a partition, B, into two compartments, as shown. At or near each corner of the lower side or open bottom of the box I secure a small wheel, c, (preferably caster-wheels,) upon which the box will rest when it is properly placed upon the floor with its open end downward. A block, D, is secured to the top of the box, in which an angular socket, e, is made for the reception of one end of a long handle by means of which the box is moved and managed.

The beater is composed of a number of parallel bars, $f f f$, placed at a short distance apart, and secured together by transverse bars on their upper sides. This beater is placed across one end of the box A at its bottom, and has a strong metallic stem, F, extending upward from its middle, and passing through a guide, G, in the lower compartment. The upper end of the stem F is hollow, and a strong spiral spring, $g$, is placed in the cavity or hollow space. A screw, $h$, passes down through the partition B from the upper compartment, and serves by compressing the spring to regulate its tension, and the force of the blow. A shaft, I, passes across the box A, just in front of the stem F, and upon this shaft is secured a cam, J, which (when the shaft is rotated) strikes a projection or tappet, K, on the stem, and lifts the beaters, while the spring drives them back against the carpet when the cam leaves the tappet.

The shaft I can be rotated by any suitable power, but I have represented it in this instance as being driven by means of a friction-wheel or drum, M, which is secured upon a horizontal shaft, N, and which is large enough to bear upon the floor when the machine is working.

The shaft N is parallel with the shaft I, and the friction-driver M engages with a friction-wheel, O, on the shaft I, so that the entire power for driving the machine is derived from the pressure upon the machine as it moves over the floor.

A case, P, is secured in the partition B so as to be partly in the lower and partly in the upper compartments of the box, and in this case I mount a suction-fan, Q. This fan is driven by a belt-connection with a pulley, $r$, on the shaft I. An opening in the sides of the case P allows the dust as it rises on the lower compartment to be drawn by the fan into the case, and as the case opens into the upper compartment it will be blown into that compartment and collected.

A hand-hole, S, is made in the top of the box, through which the dust or dirt can be removed, and through which the tension-screw $h$ can be turned, in order to regulate the force of the blow. This hand-hole is kept tightly covered when the machine is at work.

In order to pack the lower edges of the box, and prevent any dust from escaping from the lower compartment, I secure a strip, $u$, of india-rubber around the lower edges of the sides, which is wide enough to touch the floor, and make a sufficiently tight joint. A brush can also be mounted in the lower compartment to sweep the carpet in rear of the beaters.

I thus provide a machine which can be moved over a carpet in the same manner as the ordinary carpet-sweepers, and which will beat and sweep it clean without removing it from the floor.

By using this machine once every two or three days upon a carpet, it can be kept perfectly clean and free from dust, without the disagreeable necessity of occasionally taking it up, and sending it away to be beaten and cleaned.

Having thus described my invention, what I claim, and desire to secure by Letters Patent, is—

The open-bottom box A, separated into two compartments by the partition B, and having a spring-beater, $fff$, in the lower compartment, which is operated by a cam, J, and tappet K, the cam-shaft being driven by frictional connections with the frictional driving-wheel M, said box having also a fan, Q, rotated in a case, P, which withdraws the dust from the lower compartment and forces it into the upper one, substantially as and for the purpose described.

CHARLES ELSASSER.

Witnesses:
GEO. H. STRONG,
JNO. L. BOONE.